(12) United States Patent
Lallemant et al.

(10) Patent No.: US 9,920,721 B2
(45) Date of Patent: Mar. 20, 2018

(54) DISTRIBUTION MODULE FOR DISTRIBUTING AN INLET MIXTURE

(71) Applicant: Valeo Systemes de Controle Moteur, Cergy Saint Christophe (FR)

(72) Inventors: Mathieu Lallemant, Maisons-Laffitte (FR); Franck Girardon, Conflans Sainte Honorine (FR); Patrick Lebrasseur, Montagny en Vexin (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 82 days.

(21) Appl. No.: 14/899,321

(22) PCT Filed: Jun. 13, 2014

(86) PCT No.: PCT/FR2014/051466
§ 371 (c)(1),
(2) Date: Mar. 16, 2016

(87) PCT Pub. No.: WO2014/207342
PCT Pub. Date: Dec. 31, 2014

(65) Prior Publication Data
US 2016/0215737 A1    Jul. 28, 2016

(30) Foreign Application Priority Data
Jun. 25, 2013   (FR) ..................... 13 56075

(51) Int. Cl.
*F02M 35/104*   (2006.01)
*F02M 35/10*    (2006.01)
(Continued)

(52) U.S. Cl.
CPC ....... *F02M 35/104* (2013.01); *F02B 29/0418* (2013.01); *F02M 26/04* (2016.02);
(Continued)

(58) Field of Classification Search
CPC .......... F02M 35/104; F02M 35/10157; F02M 35/10222; F02M 35/10268;
(Continued)

(56) References Cited

U.S. PATENT DOCUMENTS 5,207,714 A * 5/1993 Hayashi ................. F02M 26/18
                                                 123/568.17
5,709,191 A * 1/1998 Monnier .................... F02D 9/02
                                                   123/302
(Continued)

FOREIGN PATENT DOCUMENTS

EP      1496221 A2    1/2005
EP    1 533 512 A2    5/2005
(Continued)

OTHER PUBLICATIONS

International Search Report issued in corresponding application No. PCT/FR2014/051466 dated Aug. 25, 2014 (6 pages).

*Primary Examiner* — Lindsay Low
*Assistant Examiner* — George Jin
(74) *Attorney, Agent, or Firm* — Osha Liang LLP (57) ABSTRACT

The invention relates to a distribution module (11) for distributing an inlet mixture to at least two cylinders of a heat engine, this inlet mixture selectively comprising:—cooled inlet air, or—non-cooled inlet air, or—recirculation gas, or—a combination of at least two of the above elements, the module (11) comprising:—a first inlet (21) for conveying cooled inlet air into the module (11),—a second inlet (22) for conveying non-cooled inlet air into the module (11),—a third inlet (23) for conveying recirculation gas into the module (11), the module being arranged to distribute the inlet mixture substantially equally between said at least two cylinders.

14 Claims, 4 Drawing Sheets

(51) Int. Cl.
*F02B 29/04* (2006.01)
*F02M 26/19* (2016.01)
*F02M 26/04* (2016.01)
*F02M 26/20* (2016.01)
*F02M 26/22* (2016.01)

(52) U.S. Cl.
CPC ............ *F02M 26/19* (2016.02); *F02M 26/20* (2016.02); *F02M 26/22* (2016.02); *F02M 35/1045* (2013.01); *F02M 35/10091* (2013.01); *F02M 35/10157* (2013.01); *F02M 35/10222* (2013.01); *F02M 35/10268* (2013.01); *Y02T 10/146* (2013.01)

(58) Field of Classification Search
CPC ....... F02M 35/10091; F02M 35/10045; F02M 35/10124; F02M 35/101255; F02M 35/10262; F02M 26/04; F02M 26/20; F02M 26/22; F02M 26/21
See application file for complete search history.

(56) References Cited

U.S. PATENT DOCUMENTS

| | | | | | |
|---|---|---|---|---|---|
| 5,957,116 | A * | 9/1999 | Haegele | ........... | F02M 35/10052 123/568.12 |
| 6,138,649 | A * | 10/2000 | Khair | ............ | F01N 3/031 123/559.2 |
| 6,422,221 | B2 * | 7/2002 | Pietrowski | ............ | F02B 75/22 123/184.61 |
| 6,691,686 | B2 * | 2/2004 | Klas | ............ | F02B 75/22 123/184.21 |
| 2004/0112345 | A1 * | 6/2004 | Bertilsson | ............ | F02M 26/40 123/568.17 |
| 2007/0039597 | A1 * | 2/2007 | Zukouski | ......... | F02M 35/10222 123/568.17 |
| 2007/0107708 | A1 * | 5/2007 | Uchiyama | ............ | F02M 26/28 123/568.18 |
| 2008/0149198 | A1 * | 6/2008 | Fuchinoue | ....... | F02M 35/10118 137/561 A |
| 2010/0263637 | A1 * | 10/2010 | Muller | ............ | F02B 29/0418 123/556 |
| 2011/0088673 | A1 * | 4/2011 | Kapala | ............ | F02M 35/10222 123/568.17 |
| 2012/0304970 | A1 * | 12/2012 | Schlemmer-Kelling | ............ | F02M 35/10222 123/568.12 |
| 2013/0298884 | A1 * | 11/2013 | Odillard | ............ | F02M 35/10222 123/568.17 |
| 2014/0150757 | A1 * | 6/2014 | Drangel | ............ | F02M 25/07 123/568.11 |
| 2014/0238362 | A1 * | 8/2014 | Tillier | ............ | F02M 35/10222 123/568.11 |
| 2015/0159590 | A1 * | 6/2015 | Ferlay | ............ | F02M 25/0712 123/540 |
| 2016/0025045 | A1 * | 1/2016 | Engineer | ............ | F02M 26/20 123/568.12 |
| 2016/0186651 | A1 * | 6/2016 | Elflein | ............ | F02M 35/10222 123/540 |

FOREIGN PATENT DOCUMENTS

| | | |
|---|---|---|
| FR | 2879262 A1 | 6/2006 |
| FR | 2946697 A1 | 12/2010 |

\* cited by examiner

DISTRIBUTION MODULE FOR DISTRIBUTING AN INLET MIXTURE

This invention relates to a distribution module for distributing an intake mixture to at least two cylinders of a combustion engine.

Patent Application FR 2 946 697 discloses a device for mixing a flow of gas in the cylinder head of a combustion engine of a motor vehicle. This device comprises a heat exchanger, comprising a heat exchange tube nest arranged to exchange heat with the intake gases, comprising air circulating in the heat exchange nest.

The intake gases are introduced into the heat exchanger through an inlet manifold, mounted upstream of the heat exchanger, and are expelled through a distribution manifold, mounted downstream of the heat exchanger and designed to be connected to the cylinder head of the engine.

The mixing device comprises a gas guiding case having a polygonal section transverse to the direction of circulation of the gases in the guiding case, arranged to guide the gases from upstream to downstream in the mixing device. The distribution manifold is mounted on the engine cylinder head. The distribution manifold enables a split intake, in the cylinder head, of the flow of cooled gas exiting the heat exchanger.

The mixing device also comprises means for injecting a flow of recirculated exhaust gas from the engine, known to a person skilled in the art by the acronym EGR (Exhaust Gas Recirculation). The injection means comprise a plurality of diffusion orifices leading to the guiding case, the said diffusion orifices extending substantially in the same plane and being arranged to inject the flow of recirculated exhaust gas perpendicular to the main direction of circulation of the gases in the guiding case.

One drawback connected with such a device is that it is not adapted for use with other types of gas mixtures.

The present invention aims chiefly to overcome this drawback.

An aim of the invention is therefore a distribution module to distribute an intake mixture to at least two cylinders of a combustion engine, this intake mixture comprising selectively:
- cooled intake air, or
- uncooled intake air, or
- recirculation gas, or
- a combination of at least two of the above elements, the module comprising:
- a first inlet enabling cooled intake air to be conveyed into the module,
- a second inlet enabling uncooled intake air to be conveyed into the module,
- a third inlet enabling recirculation gas to be conveyed into the module, the module being arranged so as to distribute the intake mixture in a substantially equal manner between these at least two cylinders,
    - the module comprising a mixing chamber into which lead the first, second and third inlets and in which the intake mixture is made,
    - the second inlet being connected to a first distribution organ arranged to distribute the uncooled intake air in the mixing chamber,
    - the third inlet being connected to a second distribution organ arranged to distribute the recirculation gas in the mixing chamber,
the at least one of the first and second distribution organs having a tubular form.

Thanks to the invention, it is possible to distribute other types of mixtures, notably the combination comprising uncooled intake air and recirculation gas. The invention is particularly suitable in an air intake circuit comprising a bypass path of the cooled path.

The module may comprise a mixing chamber into which lead the first, second and third inlets and in which the intake mixture is made. Such a mixture can thus be made before entering the cylinders of the combustion engine.

The mixing chamber may comprise a single compartment leading to the cylinder assembly. Such a compartment enables a uniform mixing of the elements capable of arriving through the first, second and third inlets.

As a variation, the mixing chamber may comprise a plurality of compartments, at least one of the compartments leading to one of the cylinders of the combustion engine. This enables the mixture to be apportioned according to a predetermined law of apportionment and to distribute the mixture in a reliable manner between the cylinders of the combustion engine.

The mixing chamber may comprise a plurality of compartments each leading to one of the cylinders of the combustion engine. This particular arrangement offers the advantage of enabling a better distribution between all of the cylinders of the combustion engine. In fact, mixing is performed in a given compartment and the mixture is then distributed from this compartment to the cylinder of the combustion engine to which the compartment leads.

The distribution module can be arranged so that the cooled intake air and the uncooled intake air flow into the mixing chamber in converging directions. Thus, the cooled intake air and the uncooled intake air are better mixed when they pass through the mixing chamber.

The distribution module can be arranged so that the cooled intake air and the recirculation gas flow into the mixing chamber in converging directions. Thus the cooled intake air and the recirculation gas are better mixed when they pass through the mixing chamber.

The distribution module can be arranged so that the uncooled intake air and the recirculation gas flow into the mixing chamber in the same direction. This arrangement enables a particularly effective mixing when the cooled intake air flows into the mixing chamber.

The distribution module can be arranged so that the uncooled intake air and the recirculation gas flow into the mixing chamber in converging directions. This arrangement enables a mixing of the cooled intake air with the recirculation gas. This arrangement enables a particularly effective mixing when there is no cooled intake air flowing into the mixing chamber.

The distribution module can be arranged so that the uncooled intake air and the recirculation gas flow into the mixing chamber, in substantially opposite directions.

As a variation, the distribution module can be arranged so that the uncooled intake air and the recirculation gas flow into the mixing chamber, substantially in the same direction.

The second inlet can be connected to a first distribution organ arranged to distribute the uncooled intake air in the mixing chamber.

The third inlet can be connected to a second distribution organ arranged to distribute the recirculation gas in the mixing chamber.

In other words, the uncooled intake air and the recirculation gas can pass through two separate distribution organs to enter the mixing chamber.

At least one of the first and second distribution organs can comprise a plurality of distribution orifices. The plurality of orifices enables the creation of injection points within the mixing chamber. This enables the effectiveness of mixing to increase and thus improve the distribution of the elements circulating in the distribution organ in question, inside the mixing chamber.

At least one of the first and second distribution organs may comprise a channel common to all of the orifices. Such a distribution organ enables a good distribution to be ensured, whilst being of simple design.

At least one of the first and second distribution organs may comprise a plurality of channels each associated with an orifice.

The mixing chamber may comprise a plurality of compartments and each orifice may lead to one of the compartments of the mixing chamber. This arrangement enables the distribution of the mixture in the mixing chamber to be improved, each compartment containing a part of the mixture. "Compartment" means a portion of the mixing chamber isolated from the rest of the mixing chamber. In other words, the mixture cannot circulate from one compartment to the other.

At least one of the first and second distribution organs may comprise as many channels as cylinders of the combustion engine, this number being for example equal to four. In other words, each channel may be dedicated to the distribution of the intake air and/or recirculation gas, in one particular cylinder.

At least one of the channels may form at least one elbow.

The orifices of at least one of the first and second distribution organs may be arranged substantially equidistant from each other. This arrangement enables the effectiveness of the mixing to be increased.

The orifices of at least one of the first and second distribution organs may be arranged at a variable distance from each other.

The orifices of at least one of the first and second distribution organs may be aligned substantially along a line segment.

The orifices of at least one the first and second distribution organs may be arranged substantially on either side of a line segment.

At least one of the first and second distribution organs may comprise as many orifices as cylinders of the combustion engine, this number being for example between two and six, for example four.

At least one of the first and second distribution organs may comprise more orifices than cylinders.

At least one of the first and second distribution organs may comprise fewer orifices than cylinders.

The first distribution organ may have a cross-section and at least one of its orifices may be smaller or of the same size as the cross-section of the first organ.

The second distribution organ may have a cross-section and at least one of its orifices may be smaller or the same size as the cross-section of the second organ.

For at least one of the first and second distribution organs, the orifices of the said distribution organ may have a different surface area, for example smaller, than the surface area of another of its orifices.

For at least one of the first and second distribution organs, the orifices of the said distribution organ may have a surface area that lengthens as the distance from its respective inlet increases. Thus it is possible to achieve a homogenous distribution along the distribution organ and to compensate for the variations of the flow therein.

At least one of the first and second distribution organs may have a tubular form.

The cross-section of this tubular form may be constant along this tubular form.

The cross-section of this tubular form may be variable along this tubular form. This particular form can enable a better distribution of the flow of gases along the entire length of the mixing chamber to create a Venturi effect.

The first and second distribution organs may have a cross-section with a different surface area.

As a variation, the first and second distribution organs may have a cross-section with substantially the same surface area.

The tubular form may have a circular cross section.

At least one of the first and second distribution organs may be closed at its end opposite its inlet. Thus, the fluid circulating in the circulation organ can only come out through its orifices.

At least one of the first and second distribution organs may extend substantially the entire length of the mixing chamber. This arrangement offers the advantage of enabling a good distribution of the fluid circulating therein along the entire length of the mixing chamber.

At least the first and second distribution organs may extend along only part of the length of the mixing chamber, for example along less than half this length.

The first inlet may have a longitudinal form, for example rectangular, and at least one of the first and second distribution organs may extend in the longitudinal direction of this first inlet.

At least one of the first and second distribution organs may be arranged offset in relation to the first inlet so as to leave the flow of cooled intake air free.

The distribution module may be arranged so that the cooled intake air leaves the first inlet homogeneously over the entire surface area of this first inlet.

At least one of the first and second distribution organs may be made in the form of a one-piece casting incorporating also the mixing chamber.

As a variation, at least one of the first and second distribution organs may be made in the form of separate castings fitted onto the mixing chamber.

As a variation, at least one of the first and second distribution organs may be made as, or in the form of, an extruded tube with drilled orifices, the tube being inserted into the mixing chamber.

The first and second distribution organs may be located one outside the other.

As a variation, one of the first and second distribution organs may be located one inside the other, at least partially.

The first and second distribution organs may be located at a non-zero distance from each other.

As a variation, the first and second distribution organs may be joined together.

The first and second distribution organs may be joined along a flat contact surface.

The first and second distribution organs may be located on either side of the first inlet.

As a variation, the first and second distribution organs may be located on the same side as the first inlet.

The first and second distribution organs may be substantially parallel.

The first distribution organ may have at least one part of its orifices facing at least one part of the orifices of the second distribution organ.

The second inlet and the third inlet may be arranged on the same side in relation to the first inlet.

As a variation, the second inlet and the third inlet may be arranged on either side of the first inlet.

The second inlet and/or the first distribution organ may be arranged so that the uncooled intake air flows into the mixing chamber at a first maximum flow rate; the third inlet and/or the second distribution organ may be arranged so that the recirculation gas flows into the mixing chamber at a second maximum flow rate, the first and second maximum flow rates being different.

The second inlet and/or the first distribution organ may be arranged so that the uncooled intake air flows into the mixing chamber at a first maximum flow rate; the third inlet and/or the second distribution organ may be arranged so that the recirculation gas flows into the mixing chamber at a second maximum flow rate, the first and second maximum flow rates being the same.

The distribution module may be arranged to enable the intake mix to be achieved with uncooled intake air and recirculation gas, without cooled intake air.

The recirculation gas of the intake mix may comprise selectively uncooled recirculation gas, or cooled recirculation gas, or a combination of the two.

The third inlet enables the uncooled recirculation gas to be conveyed into the module and the module may also comprise a fourth inlet enabling the cooled recirculation gas to be conveyed into the module.

Another aim of the invention is an intake circuit for a turbocharged engine, comprising:
a distribution module according to one of the preceding claims,
a bypass valve arranged to send, selectively, the cooled intake air or the uncooled intake air to the distribution module.

The intake circuit may also comprise:
a cooled path comprising a heat exchanger to convey the cooled intake air into the module,
an uncooled intake path to by-pass the said heat exchanger,
an EGR loop to convey the recirculation gas into the module, the bypass valve enabling the selection, either of the cooled path or of the uncooled path.

The bypass valve may also enable the quantity of intake air entering the distribution module to be metered.

The EGR loop may be a high-pressure EGR loop arranged between the part upstream of the turbine of the turbocharged engine and the distribution module.

The metering valve may be arranged in the EGR loop.

Another aim of the invention is a method for distributing an intake mixture to at least two cylinders of a combustion engine, this intake mixture comprising selectively:
cooled intake air, or
uncooled intake air, or
recirculation gas, or
a combination of at least two of the above elements, the method wherein:
cooled intake air may be conveyed into the module,
uncooled intake air may be conveyed into the module,
recirculation gas may be introduced into the module, the method wherein:
the intake mixture is distributed in a substantially equal manner between these at least two cylinders.

A detailed description of the different embodiments of a distribution module according to the invention now follows, referring to FIGS. 1 to 8. A better understanding of the invention will emerge from the following detailed description of non-limiting embodiments of the invention shown in the accompanying drawings, in which.

Figure 1:
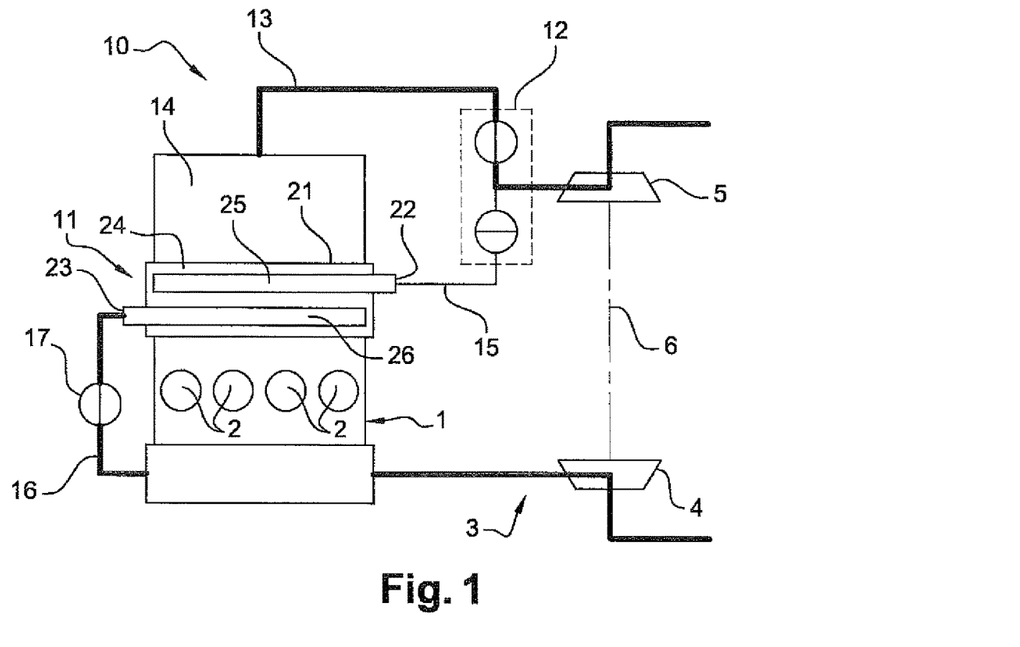
FIGS. 1 and 2 represent, in a schematic and partial manner, an intake circuit according to the invention, mounted on a turbocharged engine, according to two operating modes.
Figure 2:
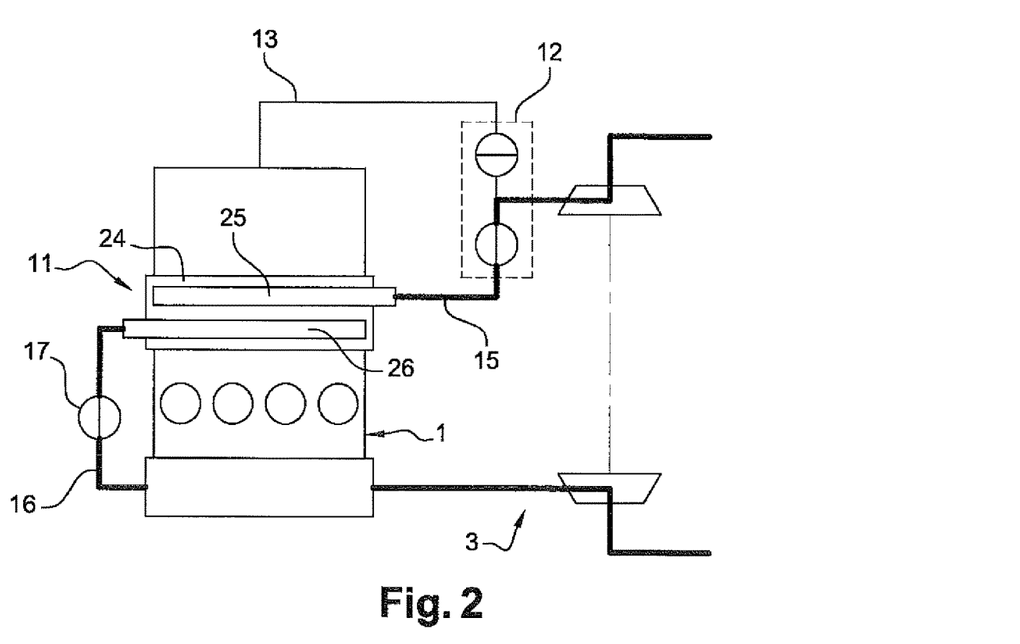

FIGS. 1 and 2 show:
a turbocharged engine 1 of a motor vehicle, this engine 1 comprising four cylinders 2,
an exhaust circuit 3, leaving the turbocharged engine 1, towards which the burnt gases are directed, these gases passing into a turbine 4 which takes part of their residual energy to activate a corresponding compressor 5, through a mechanical connection 6,
an intake circuit 10 according to the invention.

The intake circuit 10 comprises:
a distribution module 11,
a bypass valve 12 arranged so as to send, selectively, the cooled intake air or the uncooled intake air to the distribution module 11,
a cooled path 13 comprising a heat exchanger 14 to cool the intake air from the bypass valve 12,
an uncooled path 15 to bypass this heat exchanger 14,
an EGR loop 16 comprising a metering valve 17 to convey the recirculation gas into the distribution module 11.

The bypass valve 12 enables the selection, either of the cooled path 13, or of the uncooled path 15, to convey the intake air to the distribution module 11.

The intake air is compressed by the compressor 5.

The EGR loop 16 is a high-pressure EGR loop arranged between the part upstream of the turbine 4 of the turbocharged engine 1 and the distribution module 11.

The intake circuit 10 can operate in different modes, depending on the status of valves 12 and 17.

In the operating mode shown in FIG. 1, the by-pass valve 12 enables the selection of the cooled path 13 and the metering valve 17 enables the recirculation gas to return to the distribution module 11. Thus, the cooled intake air and the recirculation gas mix together in the distribution module 11. This operating mode is used, for example, when the engine is already hot and when it is not used under full load. In this case, cold air is conveyed to the intake so as not further to increase the temperature of the engine, and recirculation gas is conveyed to the intake in order to limit the volume of air in each cylinder.

In another mode shown in FIG. 2, the bypass valve 12 enables the selection of the uncooled path 15 and the metering valve 17 enables the recirculation gas to return to the distribution module 11. Thus the uncooled intake air and the recirculation gas mix together in the distribution module. This operating mode is used, for example, when the engine is cold and when it is not used under full load. This is the case, for example, when starting the vehicle.

In another mode not shown, the by-pass valve 12 enables the selection of the cooled path 13 and the metering valve 17 prevents the recirculation gas from returning to the distribution module 11. Thus, only cooled intake air enters the distribution module 11. This operating mode is for example used when the engine is hot and when it is used under full load. This is the case, for example, when the turbo is at its maximum compression ratio.

In another mode not shown, the by-pass valve 12 enables the selection of the uncooled path 15 and the metering valve 17 prevents the recirculation gas 16 from returning to the distribution module 11. Thus, only uncooled intake air enters the distribution module 11. This operating mode is used, for example, when the engine is cold and when it is used under full load. This is the case, for example, when starting the vehicle, the vehicle being on a hill and loaded.

In another mode not shown, the bypass valve 12 enables the selection both of the uncooled path 15 and of the cooled path 13 and the metering valve 17 enables the recirculation gas 16 to return to the distribution module 11.

In a last mode not shown, the bypass valve 12 enables the selection both of the uncooled path 15 and of the cooled path 13 and the metering valve 17 prevents the recirculation gas 16 from returning to the distribution module 11.

Figure 3:
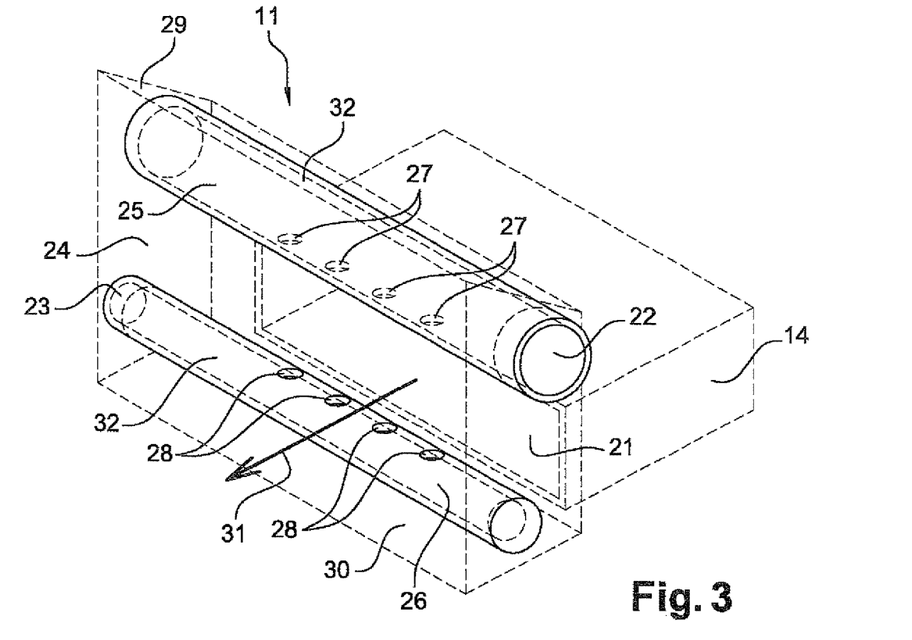
FIG. 3 is a schematic and partial perspective view of the distribution module of the circuit in FIGS. 1 and 2, FIGS. 4 to 6 are schematic and partial perspective views of a distribution module according to other embodiments of the invention.

The distribution module 11 will now be described in further detail, with reference to FIG. 3.

The distribution module 11 enables an intake mixture to be distributed to the cylinders 2.

This intake mixture comprises selectively:
cooled intake air, or
uncooled intake air, or
recirculation gas, or
a combination of at least two of the above elements.

Module 11 comprises:
a first inlet 21 enabling the cooled intake air to be conveyed into the module 11, this cooled intake air coming from the cooled path 13 and having previously passed through the heat exchanger 14, in the configuration where the by-pass valve 12 is configured to convey the intake air leaving the compressor 5 to the cooled path 13,
a second inlet 22 enabling the uncooled intake air to be conveyed into the module 11, in the configuration where the by-pass valve 12 is configured so as to convey the intake air leaving the compressor 5 to the uncooled path 15,
a third inlet 23 enabling the recirculation gas to be conveyed into the module 11, in the configuration where the metering valve 17 is configured to convey the recirculation gas to the third inlet 23, the module 11 being arranged to distribute the intake mixture in a substantially equal manner between the cylinders 2.

The distribution module 11 comprises a mixing chamber 24 into which the first 21, second 22 and third 23 inlets lead and in which the intake mixture is made.

The mixing chamber 24 comprises one compartment leading to the cylinder assembly 2.

The distribution module 11 is arranged so that:
the cooled intake air from the first inlet 21 and the uncooled intake air from the second inlet 22 flow into the mixing chamber 24 in converging directions,
the cooled intake air and the recirculation gas flow into the mixing chamber 24 in converging directions,
the uncooled intake air and the recirculation gas flow into the mixing chamber 24 in converging directions, and
the uncooled intake air and the recirculation gas flow into the mixing chamber, in substantially opposite directions.

The second inlet 22 is connected to a first distribution organ 25 arranged to distribute the uncooled intake air in the mixing chamber 24.

The third inlet 23 is connected to a second distribution organ 26 arranged to distribute the recirculation gas in the mixing chamber 24.

The first and second distribution organs 25 and 26 each comprise four orifices 27, 28 for distributing uncooled intake air and recirculation gas respectively in the mixing chamber 24.

The first and second distribution organs 25 and 26 each comprise a channel 32 common to the four orifices 27, 28.

The four orifices 27, 28 of each of the first and second distribution organs 25 and 26 are arranged substantially equidistant from each other.

These orifices 27, 28 are substantially aligned along a line segment.

The first distribution organ 25 has a cross-section and the four orifices 27 are smaller than the cross-section of the first organ 25.

The four orifices 27 have the same surface area.

The second distribution organ 26 has a cross-section and the four orifices 28 are smaller or of a smaller size than the cross-section of the second organ 26.

The four orifices 28 have the same surface area.

The first and second distribution organs 25 and 26 have a tubular form, with a circular and constant cross-section along this tubular form.

The first distribution organ 25 has a cross-section whose surface area is greater that the surface area of the cross-section of the second distribution organ 26.

The first distribution organ 25 is closed at the end opposite its inlet 22.

The second distribution organ 26 is closed at the end opposite its inlet 23.

The first and second distribution organs 25 and 26 each extend substantially along the entire length of the mixing chamber 24.

The first inlet 21 has a rectangular form, and the first and second distribution organs 25 and 26 each extend in the longitudinal direction of this first inlet 21.

The first and second distribution organs 25 and 26, one outside the other, are arranged on either side of the first inlet 21, substantially parallel to each other, offset in relation to the first inlet 21.

The distribution module 11 is arranged so that the cooled intake air leaves the first inlet 21 homogeneously over the entire surface area of this first inlet 21. The cooled intake air circulates in the mixing chamber, in the direction shown by the arrow 31.

The first and second distribution organs 25 and 26 are made or are in the form of extruded tubes with drilled orifices, the tubes being inserted into the mixing chamber.

Each orifice 27 of the first distribution organ 25 is facing an orifice 28 of the second distribution organ 26.

The second inlet 22 and the third inlet 23 are arranged at either side of the first inlet 21.

Clearly, the invention is not limited to the embodiment that has just been described.

Figure 4:
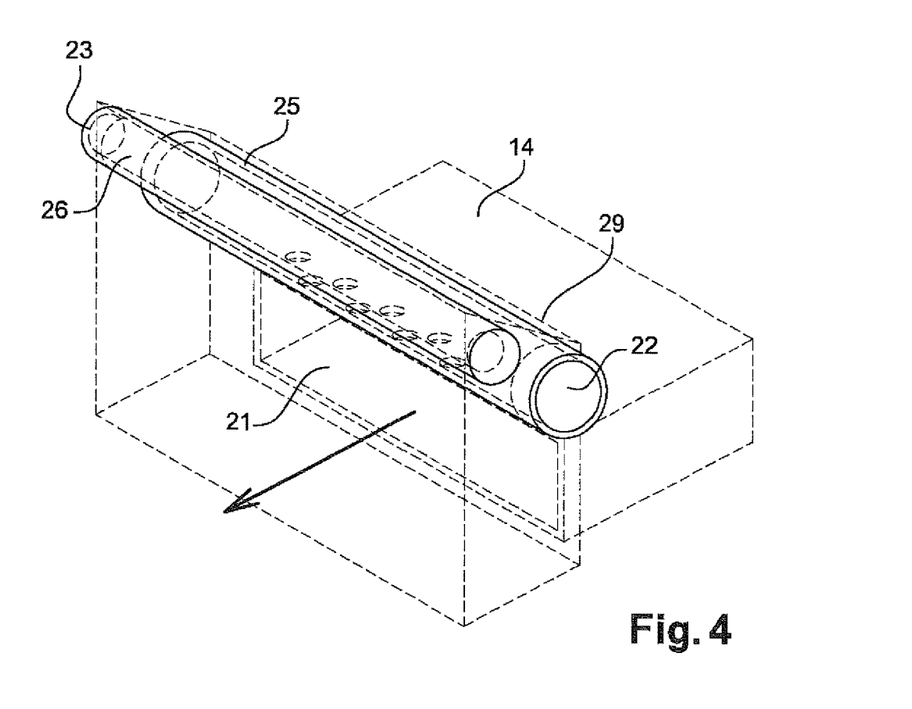

For example, as illustrated in FIG. 4, the two distribution organs 25 and 26 are not arranged on either side of the first inlet 21, but are arranged on the one and the same side of this inlet 21, being joined together. These two distribution organs 25 and 26 extend along the wall 29 of the mixing chamber 24.

The uncooled intake air and recirculation gas flow into the mixing chamber 24, in substantially the same direction.

Figure 5:
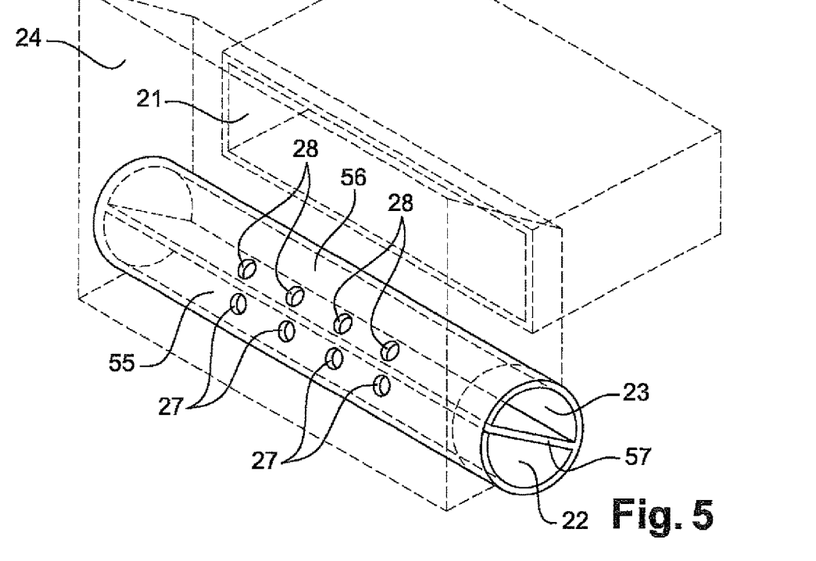

In order to reduce the space occupied by the two distribution organs, as shown in FIG. 5, it is possible to envisage distribution organs 55 and 56 that are joined along a flat contact surface 57.

In this example, the second inlet 22 and the third inlet 23 are arranged on the same side in relation to the first inlet 21.

In this example, the orifices 27 of the first distribution organ 55 have different surface areas. More precisely, their surface area increases as their distance from inlet 22 increases.

Similarly, the orifices 28 of the second distribution organ 56 have different surface areas. More precisely, their surface area increases as their distance from inlet 23 increases.

In this example, the first and second distribution organs 55 and 56 have a cross-section with substantially the same surface area.

Figure 6:
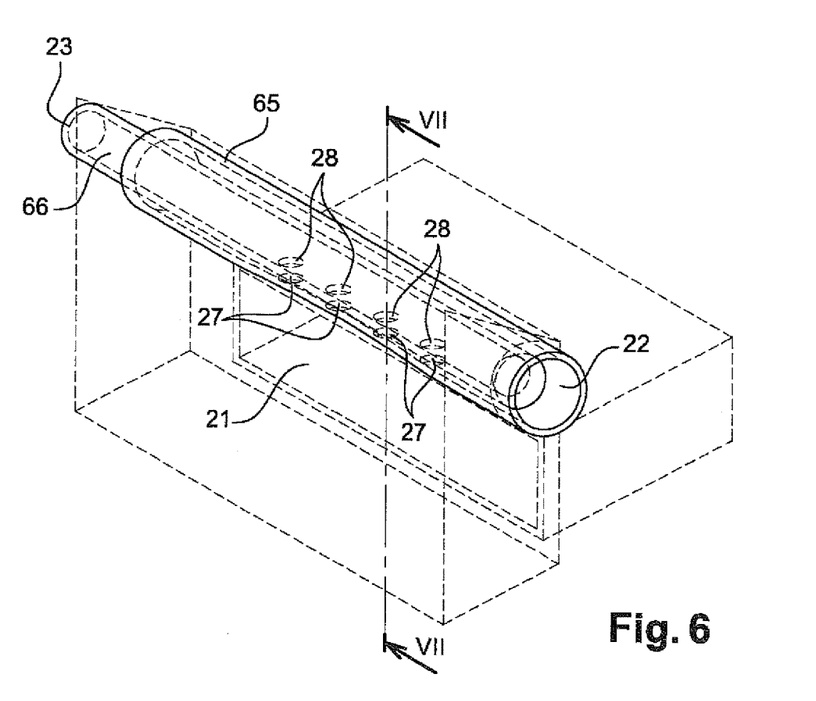

In order further to reduce the space occupied by the two distribution organs, as shown in FIG. 6, it is possible to envisage distribution organs 65 and 66 where one 66 is arranged inside the other 65.

In this example the cross-section of the distribution organ 65 is variable along the said distribution organ 65.

Figure 7:
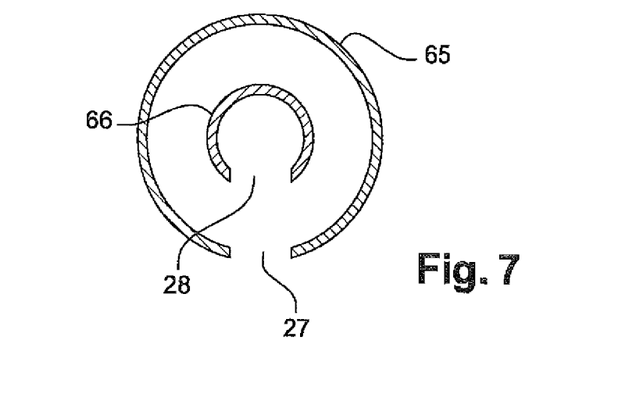
FIG. 7 is a schematic partial cross-sectional view, along VII-VII, of the two distribution organs of a distribution module of FIG. 6.

In this example, as shown in FIG. 7, each orifice 27 of the first distribution organ 65 is opposite an orifice 28 of the second distribution organ 66. The orifice 27 here has a greater surface area than that of the orifice 28.

Figure 8:
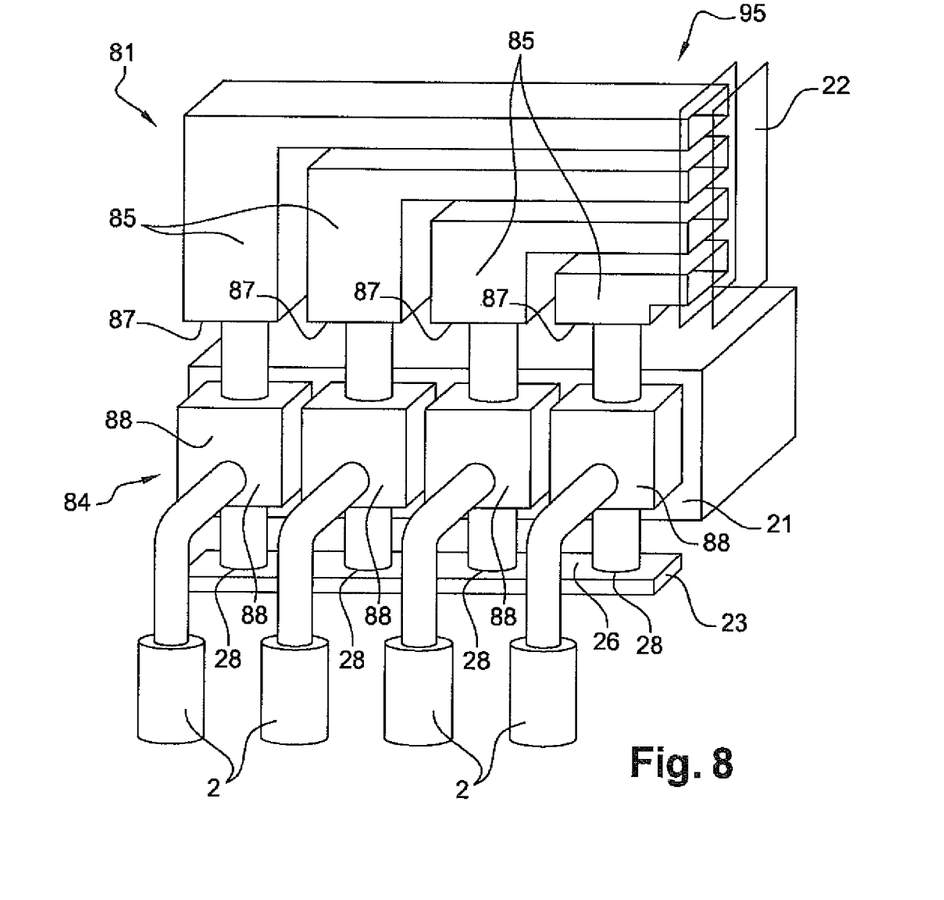
FIG. 8 is a schematic partial perspective view of a distribution module according to another embodiment of the invention.

FIG. 8 shows a distribution module 81 comprising a mixing chamber 84 into which lead the first 21, second 22 and third 23 inlets and in which the intake mixture is made.

The mixing chamber 81 comprises four compartments 88, each compartment leading to one of the cylinders 2 of the combustion engine.

Compartments 88 are substantially isolated from each other.

The distribution module 81 comprises a first distribution organ 95.

This first distribution organ 95 comprises four channels 85 independent of each other. Each channel 85 is associated with an orifice 87, each orifice 87 leading to one of the compartments 88 of the mixing chamber 24.

Each channel 85 forms a right-angled elbow.

The distribution module 81 also comprises a second distribution organ 26.

In this example, this second distribution organ 26 comprises a common channel and also comprises four orifices 28, the orifices 28 each leading into one compartment 88 of the mixing chamber 24.

The invention claimed is:

1. A distribution module to distribute an intake mixture to at least two cylinders of a combustion engine, the intake mixture comprising: cooled intake air, uncooled intake air, and recirculation gas, the module comprising:
   a first inlet enabling cooled intake air to be conveyed into a mixing chamber;
   a second inlet enabling uncooled intake air to be conveyed into the mixing chamber; and
   a third inlet enabling recirculation gas to be conveyed into the mixing chamber,
   wherein the mixing chamber into which lead the first, second and third inlets, and in which the intake mixture is made, is arranged so as to distribute the intake mixture in a substantially equal manner between the at least two cylinders,
   the second inlet being connected to a first distribution organ arranged to distribute the uncooled intake air in the mixing chamber,
   the third inlet being connected to a second distribution organ arranged to distribute the recirculation gas in the mixing chamber.

2. The distribution module according to claim 1, at least one of the first and second distribution organs comprising a plurality of distribution orifices.

3. The distribution module according to claim 1, the first and second distribution organs being located one outside the other.

4. The distribution module according to claim 1, one of the first and second distribution organs being located one inside the other, or at least partially.

5. The distribution module according to claim 1, the first and second distribution organs being located at a non-zero distance from each other.

6. The distribution module according to claim 1, the first and second distribution organs being joined.

7. The distribution module according to claim 1, the first and second distribution organs being located on either side of the first inlet.

8. The distribution module according to claim 1, the first and second distribution organs being located on the same side as the first inlet.

9. The distribution module according to claim 1, arranged to enable the intake mixture to be achieved with uncooled intake air and recirculation gas, without cooled intake air.

10. The distribution module according to claim 1, further comprising
    a by-pass valve arranged to send intake air into the first inlet or the second inlet.

11. The distribution module according to claim 1, further comprising:
    a cooled path comprising a heat exchanger to convey the cooled intake air into the mixing chamber;
    an uncooled path to by-pass the heat exchanger; and
    an EGR loop to convey the recirculation gas into the mixing chamber,
    the by-pass valve enabling the selection either of the cooled path or of the uncooled path.

12. A distribution module to distribute an intake mixture to at least two cylinders of a combustion engine, the intake mixture comprising: cooled intake air, uncooled intake air, and recirculation gas, the module comprising:
    a first inlet enabling cooled intake air to be conveyed into a mixing chamber;
    a second inlet enabling uncooled intake air to be conveyed into the mixing chamber;
    a third inlet enabling recirculation gas to be conveyed into the mixing chamber,
    wherein the mixing chamber into which lead the first, second and third inlets, and in which the intake mixture is made, is arranged so as to distribute the intake mixture in a substantially equal manner between the at least two cylinders,
    the second inlet being connected to a first distribution organ arranged to distribute the uncooled intake air in the mixing chamber,
    the third inlet being connected to a second distribution organ arranged to distribute the recirculation gas in the mixing chamber,
    one of the first and second distribution organs being located inside the other, at least partially.

13. A distribution module to distribute an intake mixture to at least two cylinders of a combustion engine, the intake mixture comprising: cooled intake air, uncooled intake air, and recirculation gas, the module comprising:
    a first inlet enabling cooled intake air to be conveyed into a mixing chamber;
    a second inlet enabling uncooled intake air to be conveyed into the mixing chamber;
    a third inlet enabling recirculation gas to be conveyed into the mixing chamber, wherein the mixing chamber into which lead the first, second and third inlets, and in which the intake mixture is made, is arranged so as to distribute the intake mixture in a substantially equal manner between the at least two cylinders, the second inlet being connected to a first distribution organ arranged to distribute the uncooled intake air in the mixing chamber, the third inlet being connected to a second distribution organ arranged to distribute the recirculation gas in the mixing chamber, and the first and second distribution organs being joined.

14. A distribution module to distribute an intake mixture to at least two cylinders of a combustion engine, this intake mixture comprising: cooled intake air, uncooled intake air, and recirculation gas, the module comprising:

a first inlet enabling cooled intake air to be conveyed into a mixing chamber;

a second inlet enabling uncooled intake air to be conveyed into the mixing chamber;

a third inlet enabling recirculation gas to be conveyed into the mixing chamber, wherein the mixing chamber into which lead the first, second and third inlets, and in which the intake mixture is made, is arranged so as to distribute the intake mixture in a substantially equal manner between the at least two cylinders, the second inlet being connected to a first distribution organ arranged to distribute the uncooled intake air in the mixing chamber, the third inlet being connected to a second distribution organ arranged to distribute the recirculation gas in the mixing chamber, the first and second distribution organs being located on the same side as the first inlet.

* * * * *